April 30, 1940.　　　　J. F. ROBB　　　　2,199,010
BATCHING APPARATUS RECORDING MECHANISM
Filed Jan. 3, 1936　　　3 Sheets-Sheet 1
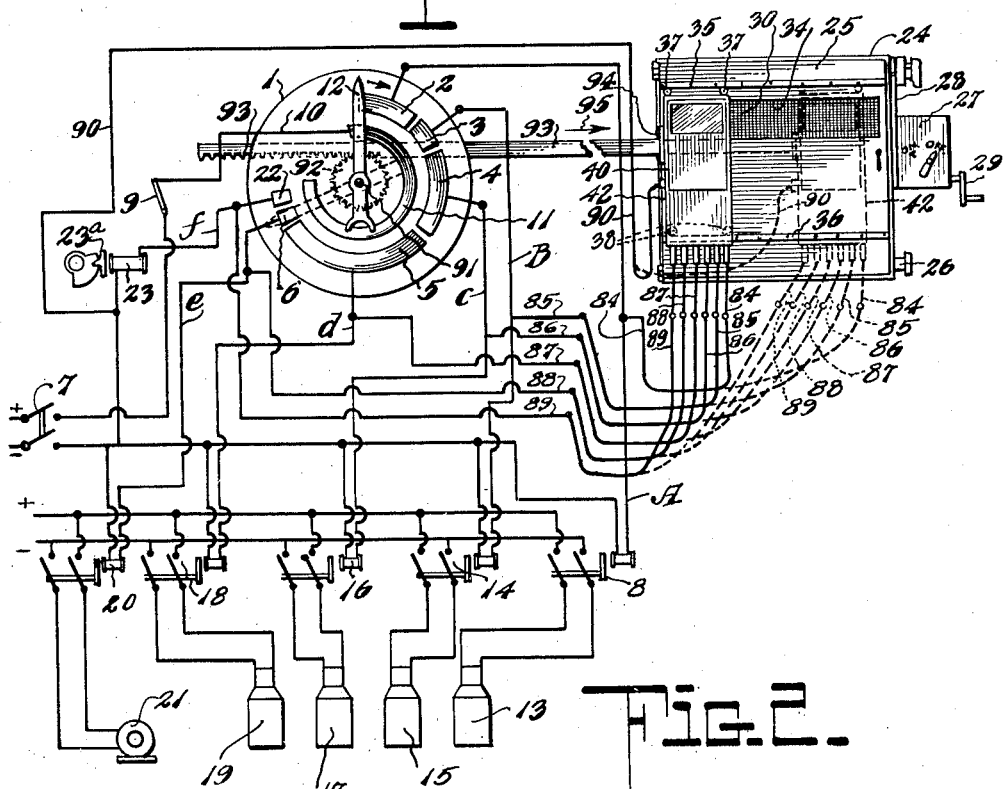
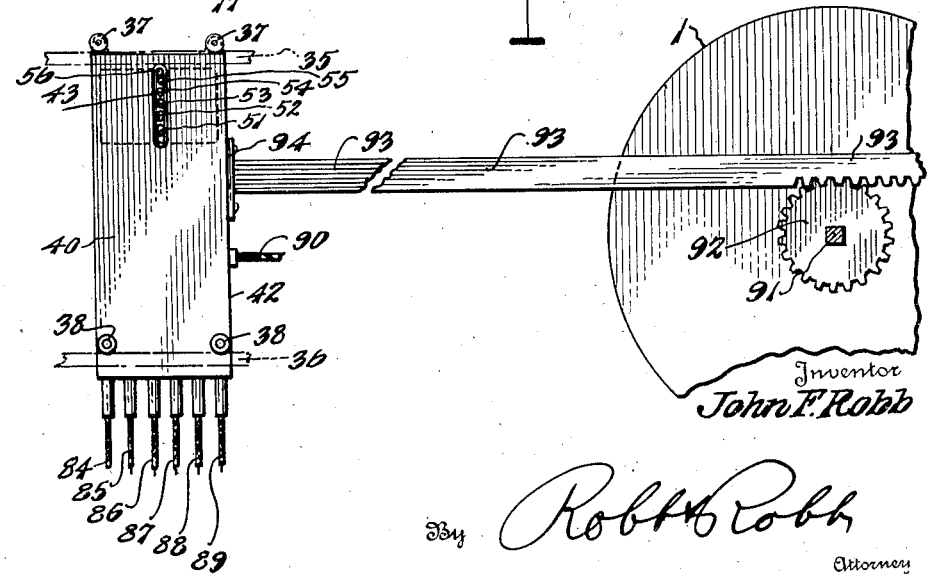
Inventor
John F. Robb
By Robt H Robb
Attorney April 30, 1940.    J. F. ROBB    2,199,010
BATCHING APPARATUS RECORDING MECHANISM
Filed Jan. 3, 1936    3 Sheets-Sheet 2
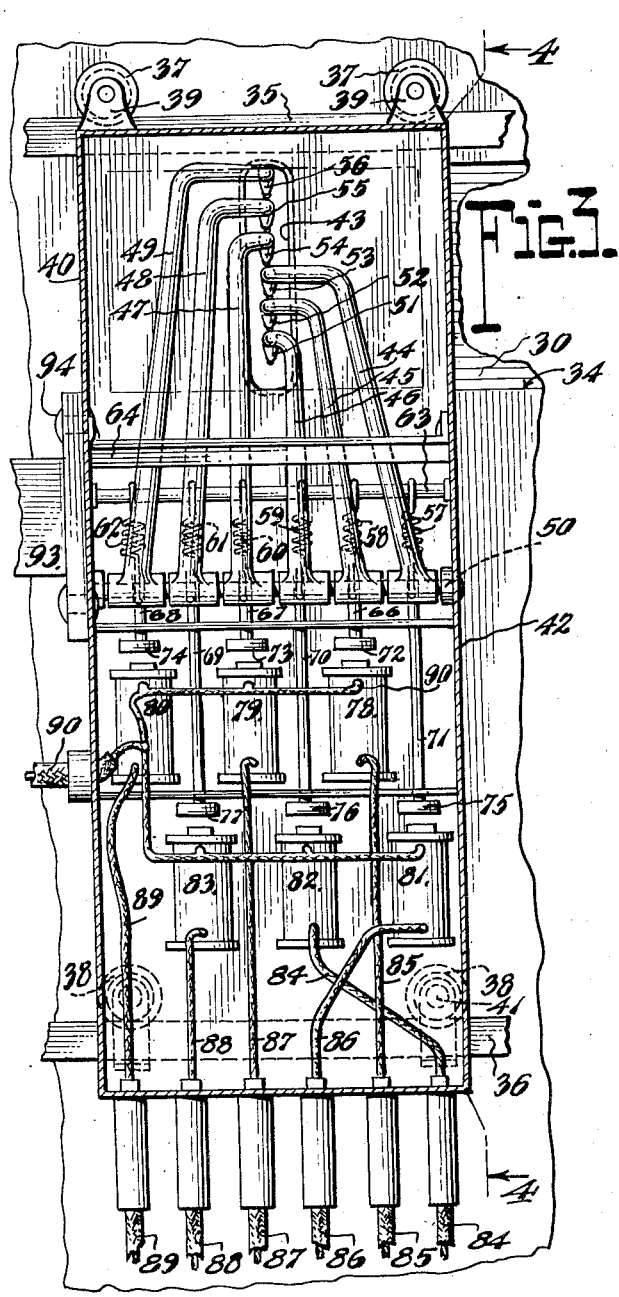
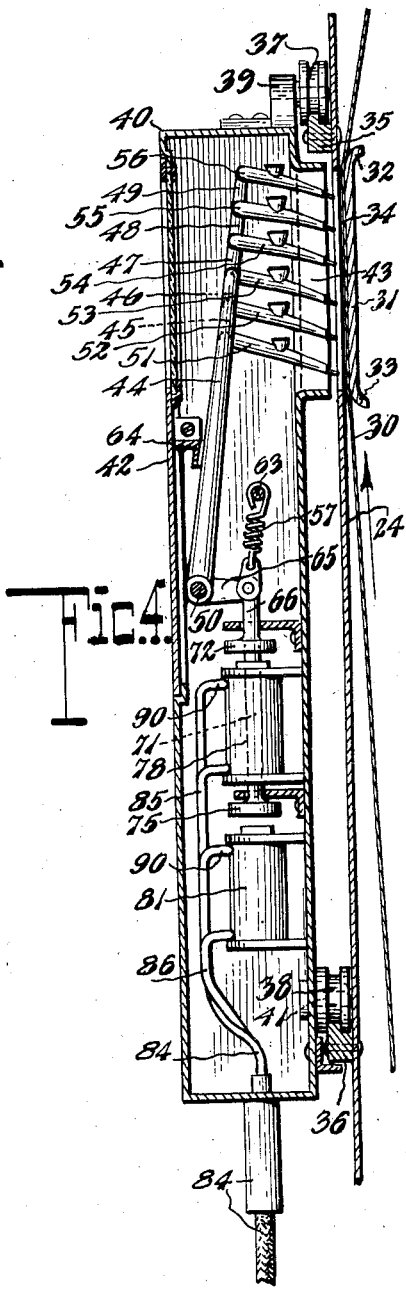
Inventor
John F. Robb
By Robb & Robb
Attorneys April 30, 1940.　　　　J. F. ROBB　　　　2,199,010
BATCHING APPARATUS RECORDING MECHANISM
Filed Jan. 3, 1936　　　3 Sheets-Sheet 3
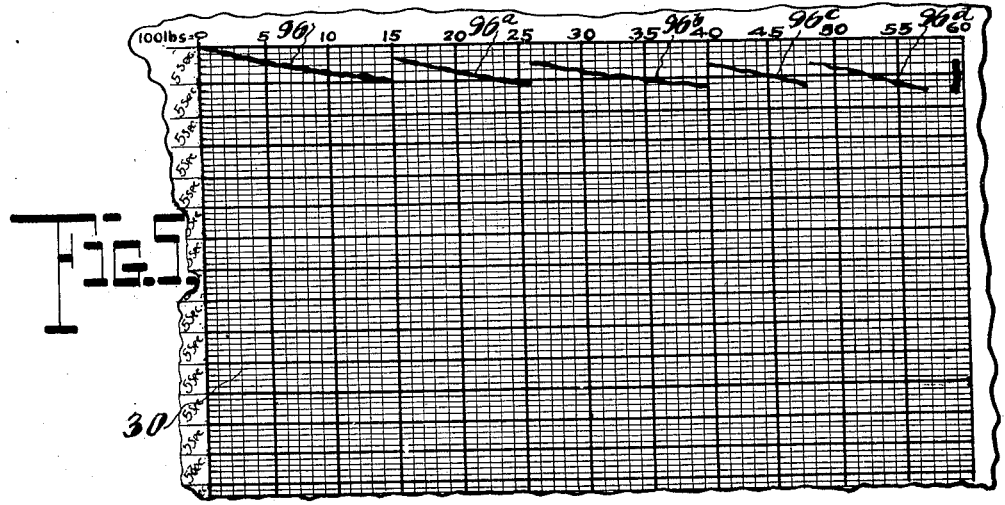
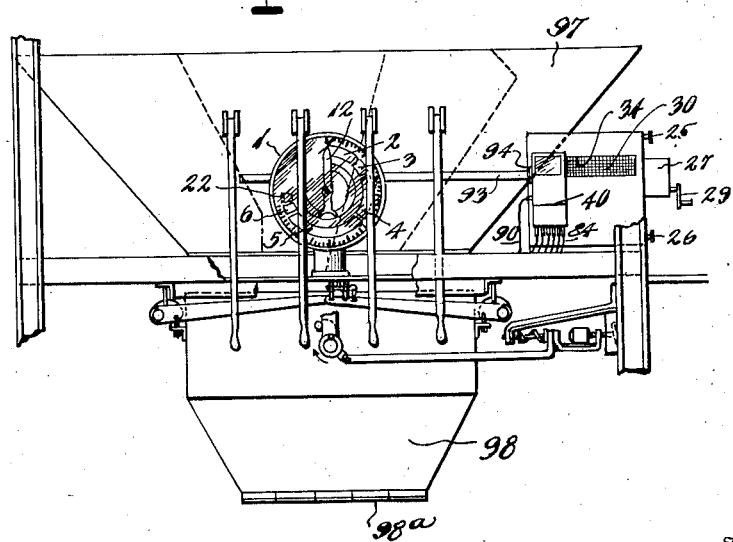

Patented Apr. 30, 1940

2,199,010

UNITED STATES PATENT OFFICE 2,199,010

BATCHING APPARATUS RECORDING MECHANISM

John F. Robb, Cleveland Heights, Ohio

Application January 3, 1936, Serial No. 57,445

14 Claims. (Cl. 249—14)

It has been proposed in the art of batching of aggregate materials, as for instance for the making of batches of materials for concrete or the like, to avail of two types of apparatus. One of these types may be characterized as a multiple weighing hopper form of apparatus, as exemplified by Robb Letters Patent No. 1,750,244, issued March 11, 1930. In apparatus of this sort each material of those making up the final batch is weighed separately in its own particular hopper, and after being weighed the materials are combined by being discharged into a common combining hopper or receptacle, from which they may be supplied to a mixed or similar apparatus. Another type of apparatus is that disclosed in Bliss Letters Patent No. 1,826,919, and this apparatus may be characterized as the multiple materials single weighing hopper form of device, wherein the various different aggregate materials are supplied in successive order of flow to a single weighing receptacle or hopper, wherein they are consecutively weighed until the total batch has been measured by this method, whereupon the materials are caused to pass from said single weighing hopper or batcher to the point of use or to a mixer wherein the materials may be agitated for final combining.

So far as I am aware, it has also been proposed in the prior art to use recording mechanism for definitely recording the weight of each material supplied to the apparatus of the type for measuring multiple materials in separate weighing batchers or hoppers, one for each material.

The object of this invention has been to design graphic recording means for recording the measurement of aggregate materials in the multiple materials single weighing hopper type of apparatus above referred to. It has not heretofore been successfully proposed to record the measured quantities of such materials weighed in the single unit type of weighing batcher, the difficulty heretofore occurring residing in the fact that the materials are caused to be fed in regular order to the single weighing batcher, and a recording mechanism for such purpose has not heretofore been developed which would properly separately record the weights or measurements or time factors incident to the passage of the different materials consecutively to such a single weighing batcher. The present invention, however, accomplishes the desired result.

In the carrying out of my invention of recording mechanism for the purpose mentioned, I avail of a single batcher or weighing hopper to receive the different aggregates to be weighed therein and thus measured, the said hopper being adapted to cause the operation of the indicator of a weighing scale, which indicator is so constructed as to control the feeding of the aggregates separately to the hopper, the discontinuance of the feed of one aggregate when the proper weight thereof to be measured has been received in the hopper, the commencement of the feed action of a second aggregate to the hopper when the feed action of the first aggregate has been discontinued, the cutting off of the feed of the second aggregate to the hopper when the proper measurement thereof has been completed, the commencement of the feeding of a third aggregate to the hopper upon the discontinuance of the feed of the second aggregate, and so on. An example of such type of apparatus is found in the Letters Patent of Bliss, No. 1,826,919, and reference is made to the said Letters Patent for the details of operation and construction of such apparatus. My invention is combined cooperatively with an apparatus such as referred to and described in said Letters Patent.

I avail of a series of recording devices, each in the form of a stylus or needle, adapted to make a permanent readable record upon a moving record sheet, and I control the operation of the styli or recording needles from the indicator of the weighing mechanism which determines the weights of the various materials which are fed into the single batcher or hopper.

In apparatus such as that of my invention, the indicating mechanism, or indicating hand proper thereof, is capable of cooperation with electrical instrumentalities which open and close in regular order the feed means for each aggregate and located intermediate the aggregate supply bin and the weighing batcher or hopper. Thus, the said electrical devices are timed to operate in consecutive order and the indicator moves proportionally to the amount or weight of materials weighed in the hopper under its control. I utilize this proportional movement of the indicator to control the recording action of the styli or needles that make the actual records on the record sheet, availing of novel connections and features of construction to this end.

My invention also involves a peculiar and novel assembly of the various recording styli or needles whereby a compactness of the recording indicia on the recording sheet is obtained, reducing as much as possible the amount of recording surface that is required for the recording purposes of the invention.

My invention resides in other detail features of construction and cooperation between the recording instrumentalities availed of by me, and the indicating or measuring mechanism connected with the weighing hopper for predetermining the weights of the materials to be measured therein, all as will be more fully presented hereinafter in combination with the accompanying drawings, in which—

Figure 1 is an elevational view of the recording device of the present invention and illustrates the mechanical and electrical interconnections of the same with the wiring diagram and scale of a measuring apparatus of a multiple materials single weighing hopper device such as disclosed in Bliss Letters Patent 1,826,919.

Figure 2 is a detail view of the indicating unit of the recording device shown in Figure 1, disclosing especially the instrumentalities for shifting the indicating unit, which are operated by the scale of the weighing apparatus.

Figure 3 is a detail view of the indicating unit of Figure 1, certain parts being shown in section.

Figure 4 is a sectional view of the indicating device of Figure 3, the section being taken on line 4—4 of the latter figure.

Figure 5 shows a record sheet used in connection with the present invention for graphic indication of the discharge time of the gates for the various aggregate supplying means, and also of the actual weight of the materials which go into the weighing hopper.

Figure 6 is a fragmentary elevational view of a multiple materials single weighing hopper apparatus provided with the recording device of the present invention.

In Figure 1 there is illustrated a wiring diagram of a measuring apparatus for a multiple materials single weighing hopper device wherein the various different aggregates are supplied in a successive order to a single weighing receptacle. These materials are weighed consecutively in such single weighing receptacle until a total batch has been measured. The materials are then discharged from the weighing hopper or batcher into a mixer or the like wherein the materials may be then agitated to accomplish the final combining of the same.

In Figure 1, I indicates a weighing scale which is provided with adjustable contacts 2, 3, 4, 5, and 6. These contacts are expanded or contracted in a circumferential direction so as to make the angle of the same correspond to a certain weight indicated by the scale. The reference numeral 7 in Figure 1 indicates a main switch interposed between the wiring diagram of Figure 1 and a source of current. If the switch 7 is closed, an electromagnetic switch 8 will be operated and moved into circuit closing position when a switch 9 is also in closed position. The switch 9, as will be seen from Figure 1, is in the same electrical circuit which is closed by the switch 7. Interposed in the circuit or interconnected with the circuit of the electromagnetic switch 8 is the contact member 2, and the closing of switch 7 will therefore also energize this contact, so that in this manner the energization of the electromagnetic switch over wires 10, the contact member 11, scale pointer 12, and contact 2 is established. Closing of the electromagnetic switch 8 will in turn energize the hydraulic motor 13 which opens the gravel bin gate and a certain portion of gravel is discharged into the weighing hopper as will be clearly understood by those skilled in the art.

When the weight of the weighing batcher into which the gravel is now discharged has increased sufficiently and corresponding to the length of the contact member 2 along which the pointer 12 slides in proper weight indicating operation, the electrical contact between the contact member 2 and pointer 12 is interrupted at the moment the pointer slides out of contact with the contact member 2. The electromagnetic switch opens immediately upon interruption of the electric current in the circuit generally indicated A. This causes the release of the action of the hydraulic operator 13 and the gravel bin valve will close.

Simultaneously with this latter operation, the pointer 12 has been brought into contact with contact member 3 and the electromagnetic switch 14 is energized and will close so that the hydraulic operator 15 will now be operated to open the next bin valve which, for instance, may admit sand from the sand bin into the weighing hopper. When the proper weight of sand is established, the pointer slides off the contact 3, the action of the hydraulic operator 15 is released, the sand bin valve closes, and pointer 12 establishes contact with contact member 4, which will energize and operate the electromagnetic switch 16, effecting the operation of the hydraulic operator 17. The weighing operation continues further as the pointer 12 establishes contact with the circuit connected to the contact member 5, and, in a manner as previously described with regard to switches 8, 14, and 16, switch 18 will be energized for operation of the hydraulic operator 19. While the contact 4 may be adjusted for establishing the correct weight of fine sand to be discharged into the hopper, the contact 5 may be adjusted so as to permit the correct weighing of the cement.

The contact 6 is provided, as previously described, for the purpose of energizing electromagnetic switch 20 to operate a solenoid valve or motor 21 for opening the water valve, and water may be supplied to the weighing hopper or preferably into a separate little tank carried by the weighing hopper, and in this manner the amount of water necessary for the respective batch can be properly weighed. When the weighing operation of the water is completed the pointer 12 slides on to a contact 22, and electromagnet 23 is energized, which may either unlock the dumping device of the weighing hopper so that the contents of the same may now be discharged, or which may operate the gate of the hopper in such a manner as to effect automatic discharge of the weighing hopper. The electromagnetic switch may be preferably connected with the gate of the water tank on the weighing hopper, if such separate water tank is provided, as above referred to, so that the water is discharged at the same time with the material into a mixer or the like where further combining of the aggregates is effected.

The operation described above is substantially the same as disclosed in Bliss Patent No. 1,826,919 above referred to, and in the following a description of my recording device and the electric connections of the same and the weighing apparatus herein set forth will be specifically discussed.

Still referring now to Figure 1, 24 indicates a casing or cabinet provided with rollers 25 and 26 which carry a roll of graphic paper upon which the record of the weights and discharge times of the various aggregates is to be indicated. The roll of paper may preferably be attached to the member 26, and the free end of the graphic paper may be secured to the roll 25 in any convenient manner. The roll 25 is driven by a clock mechanism 27 and respective gearing or other driving means 28 so that the graphic paper will be moved through the cabinet of the recording device at a definitely determined speed. The clock 27 may be wound by a crank 29 and any stopping or starting mechanism may be incorporated with these clock instrumentalities to start and stop the movement of the graphic paper at will, as necessary in conformity with the operation of the machine.

Referring now to Figure 4, it will be seen that the graphic paper or record sheet indicated at 30 slides over a backboard or base 31 which is provided with the curved portions 32 and 33, so that, as will be seen from Figure 4, a perfect straightening out of the paper during contact with the member 31 is effected.

The cabinet or housing 24, see Figure 4, is provided with an opening 34, positioned directly in front of the baseboard member previously referred to. The housing 24 further carries the guide rails 35 and 36 rigidly attached thereto and adapted for engagement with guide rollers 37 and 38. The guide rollers 37 are rotatably mounted within a bracket 39 secured to an indicator unit 40, while the rollers 38 are in a similar manner connected directly to the indicator unit 40, as shown at 41. In this way the indicator unit 40 is movably attached to the recorder housing 24 and may be shifted in a horizontal direction with respect to the same by instrumentalities referred to hereinafter. It will be further mentioned that the opening 34 in the recorder housing 24 extends laterally practically over the whole width of the said housing, as clearly seen in Figure 1.

The recording device 40 consists of a housing 42 which is provided with an opening 43 adjacent the opening within the housing 24 of the recording device. A plurality of bell cranks 44, 45, 46, 47, 48, and 49 are arranged within the housing of the indicator unit and movably mounted on the shaft 50 as clearly seen from Figures 3 and 4. The upwardly extending ends of the bell cranks 44 to 49 carry stylus members 51, 52, 53, 54, 55, 56, each being provided with points as clearly seen from Figure 4. A plurality of springs 57, 58, 59, 60, 61, 62 is provided and secured to a crossbar or spring support 63 to hold the bell crank members or stylus arms in contact with an abutment member 64 secured to the housing 42.

The short arms 65 of the bell cranks 44 to 49 above referred to are connected to pull rods or members 71, 66, 70, 67, 69 and 68 respectively, which are provided at their adjacent ends with armatures 75, 72, 76, 73, 77 and 74 respectively. These armatures are arranged in spaced relationship with respect to electromagnets 78 to 83, which are adapted to attract the armatures upon their energization, to thereby exert a pull upon the pull members 66 to 71, and thereby force the stylus members 51 to 56 into contact with the record sheet to graphically indicate thereon the weighing operations of the weighing apparatus in connection with which the recording device of the present invention is to be used.

Cables 84 to 89 interconnect one side of the coil of the electromagnets referred to above with the electric circuits of the contact plates 2, 3, 4, 5, 6, and 22, while the opposite end of the coils of said electromagnets are provided with a common return consisting of a cable 90, as clearly seen from Figure 3. The cables 84 to 90 inclusive are flexible and are of sufficient length to permit the lateral shifting of the indicating unit 40.

The center shaft of the scale 1 as indicated at 91 in Figure 2 carries a gear 92 which engages a gear portion of a rack 93 rigidly attached at 94 to the indicating unit 40 above referred to. It is here mentioned that the pointer 12 is mounted on the shaft 91 of scale 1 and it will therefore be seen that while the pointer 12 is rotating in a direction as indicated by the arrow in Figure 1 during the performance of the various weighing operations of the apparatus, the rack 93 will be shifted in the direction indicated by arrow 95 in Figure 1, causing a simultaneous movement of the indicating unit 40 in a lateral direction with respect to the recording housing 24.

As mentioned before, the graphic paper or record sheet is moved by means of a clock mechanism during the operation of the recording device, and it will therefore be seen that when the bin valve for the coarse aggregate is opened during energization of the electromagnet switch 8, circuit A is energized. The electromagnet 82 of the indicating unit referred to above is conductively connected with the circuit A by means of cables 84 and 90. The electromagnet 82 is energized, which will attract the armature 76 on the pull member 70, and in view of the connection of the latter with the stylus arm 46 the same will be moved in a direction toward the record sheet until the stylus point touches the same. The record sheet which is driven by the clock will continue in its movement in the direction indicated by the arrow in Figure 4, and the indicating unit will be shifted laterally at the same time by means of the rack 93 operated by the scale mechanism during the weighing operation for the gravel aggregate. A curve similar to that indicated in Figure 5 by reference numeral 96 will be obtained and the same will clearly indicate the weight of coarse gravel and the time which was necessary for discharging the same from the bin 97 into hopper 98.

As soon as pointer 12 slides off the contact 2, and simultaneously therewith the circuit B conductively connected with contact 3 is energized. The electromagnet 82 is thereby deenergized and the stylus 46 is returned to its original position by spring 59, while electromagnet 78 is energized. The electromagnet 78 is connected by means of cable 85 to the electric circuit B, of which contact 3 is a conductive part, while the cable 90 is interconnected with the circuit B in the above manner, referred to in connection with circuit A. The energization of the electromagnet 78 will bring the stylus 52 into operative engagement with the record sheet.

In like manner the pointer 12 successively engages the contacts 4, 5, and 6 which closes the circuits c, d, and e as the indicating unit is moved to the right by the weight of the ingredients and water introduced into the weighing hopper 98. Current successively passes over the shunt circuit wires 86, 87, 88 and energizes the magnets 81, 79, 83 in the order named causing the stylus recorders 53, 54 and 55 to be moved into recording contact with the upwardly moving paper 30 to record the weights and discharge periods of the aforesaid aggregates.

The pointer now moves from the contact member 6 onto the final contact segment 22 energizing the circuit f leading to the magnet 23 which attracts the latch armature 23a releasing the discharge gate 98a on the hopper 98. The hopper is now discharged in a well known manner. Means are contemplated for preventing operation of the various magnets and stylus members during the return of the indicator 12 to zero position, this mechanism being well known and, not forming part of this invention, is not disclosed in the drawings.

Referring particularly to Fig. 5 of the drawings, it should be observed that the graphic chart is divided into divisions extending across the same which represent weight in 100 lbs. while the divisions along the length of the paper indicate periods of time. In this particular disclosure the indications represent seconds. Both of the indicators may be varied or changed according to the requirements of the apparatus. Since the paper is moved upwardly by the clockwork 27 in the direction of the arrow in Fig. 4 and the magnets are energized successively to actuate the stylus members progressively from the bottom upwardly toward the top, the record will be a series of interrupted inclined lines or curves 96—96a—96b—96c—96d extending across the paper in substantially the same general horizontal plane. For this reason the record across the paper for each batch or weighing operation occupies only a slight space although the paper actually moves a greater distance.

The stylus members may contain ink reservoirs for various colored inks or, if desired, I may use dry color leads in the stylus, the different colors indicating the different ingredients. The horizontal distance of the lines indicates the weight, while the vertical extent of the lines indicates the time or number of seconds the various aggregate supply hoppers were discharging.

Various changes in construction and operation of parts may be made without departing from the spirit of the invention as contemplated by the appending claims.

Having thus described my invention, what I claim as new and desire to secure by Letters Patent of the United States, is—

1. In recording mechanism for materials batching apparatus, in combination, a multiple materials batching hopper, source receptacles for supplying different materials to said hopper to be weighed therein, weighing mechanism for weighing materials consecutively as fed to said hopper, and a plurality of recorders, including a series of electrical contacts and associated recorder actuating circuits, cooperative with said weighing mechanism to separately record the amounts of the separate materials consecutively weighed in said hopper, said weighing mechanism including a movable electrical contact cooperative with the series of contacts aforesaid, and serving to consecutively energize the recorder actuating circuits responsive to the consecutive weighing of the materials in the hopper.

2. In a multiple materials batching apparatus, in combination, a multiple materials weighing hopper to receive different materials to be batched, a series of supply bins for different materials, feeding means intermediate the bins and the hopper for supplying and cutting off different materials, means for operating the feeding means consecutively so that the different materials of the bins will be supplied into the hopper consecutively, weighing mechanism for the hopper, graphic recorders for recording the weights of the materials weighed in the said hopper, and consecutively operable means interconnecting the recorders and weighing mechanism and automatically operable responsive to the consecutive feeding of materials into the hopper.

3. In a multiple materials batching apparatus, in combination, a multiple materials weighing hopper, weighing mechanism therefor, supply bins for materials to be conducted to said hopper, feeding means intermediate the bins and the hopper, mechanism controlling the placing of the feeding means for the various bins into operation consecutively for supplying the hopper with various materials from said bins, and recording mechanism including a record strip and a plurality of recorders cooperative therewith, together with connecting means between the recorders and the feeding means of the various bins so that a predetermined recorder is placed in operation and operatively positioned with respect to the record strip when an associated feeding means of the bin is rendered operative to perform its feeding function.

4. Means as set forth in claim 3, wherein the connecting means aforesaid comprises weighing mechanism including weighing devices for separately measuring each material supplied by its feeding means from a certain bin.

5. Means as set forth in claim 3, wherein the connecting means aforesaid comprises weighing mechanism including weighing devices for separately measuring each material supplied by its feeding means from a certain bin, said weighing mechanism comprising an indicator for indicating the weights of the materials received by the weighing hopper, and operating parts between the indicator and the recorders controlling the operation of the latter.

6. In a multiple materials batching apparatus, in combination, a multiple materials measuring hopper, supply bins to supply materials to said hopper in a consecutive manner, feeding means between the bins and the hopper consecutively operable, means for operating the said feeding means consecutively in regular order, recorders one for each feeding means for recording the action thereof, and means for operating the recorders simultaneously with the feeding means, comprising a weighing mechanism including parts for consecutively weighing the materials fed to the hopper, said weighing mechanism including an indicator adapted to indicate consecutively the weighing of materials fed to the hopper, with operating connections intermediate the said indicator and the recorders, substantially as set forth.

7. In a multiple materials batching apparatus, in combination, a measuring hopper, means for supplying materials to said hopper, including supply bins, consecutively operable feeding means between the bins and hopper, control means operable by the consecutive movements imparted to the hopper as materials are fed therein, and consecutively actuated recorders each operable in accordance with one of the consecutive movements imparted to the hopper, with connections between said recorders and said control means for rendering the recorders active consecutively.

8. Means as set forth in claim 7, wherein the recorders comprise a battery of styli to perform the recording operations, a record sheet operatively associated with the styli to be marked with a graphic record thereby, and mechanism for shifting said battery of styli with respect to said record sheet and connected to be operated by said control means.

9. Means as set forth in claim 7, wherein the recorders comprise a battery of styli to perform the recording operations upon a record sheet, and mechanism for shifting said battery of styli and connected to be operated by said control means, said control means comprising an indicator to indicate the weight of the materials measured in the hopper and connected with the hopper for actuation thereby.

10. Means as set forth in claim 7 wherein the recorders comprise a recording unit having a record sheet, a series of recording styli for graphic engagement with said record sheet and mechanism for bodily moving said series of styli in one direction with respect to said record sheet, while one of said styli is in contact with the record sheet, and means for moving said record sheet in another direction.

11. Means as set forth in claim 7 wherein the recorders comprise a recording unit having a record sheet, a series of recording styli for graphic engagement with the record sheet, said styli being mounted for progressive consecutive engagement with the record sheet in a vertical direction, means for moving said record sheet in the same direction, means for bodily moving said series of styli with respect to said record sheet in a direction at right angles to the aforesaid vertical direction comprising a weight operated member connected with said hopper to be actuated by weight introduced therein, operative means between said weight operated member and said styli for causing the aforesaid progressive engagement of said styli with said record sheet, and the aforesaid bodily movement of said styli.

12. In a multiple materials batching and recording apparatus of the class described, a weighing hopper, an actuator operable by the weight introduced in said hopper, a recording device including a record sheet, operatively connected with said actuator to be actuated thereby, said recording device comprising a plurality of recording stylus members consecutively movable into graphic engagement with the record sheet, a plurality of supply means for consecutively supplying different materials into said hopper, control means for each of said supply means, and means on said actuator for consecutively actuating said control means and their recording members including means for causing simultaneous operation of each control means and its recording stylus.

13. In a multiple materials batching apparatus, in combination, a multiple materials weighing hopper adapted to receive different materials to be batched, aggregate supply means associated with said weighing hopper and including control means for controlling the discharge of said aggregates into said weighing hopper, recording instrumentalities associated with said weighing hopper, and an actuator common to said aggregate supply means and recording instrumentalities and operatively connected therewith to automatically and consecutively actuate the aggregate discharge control means and the recording instrumentalities, said recording instrumentalities including means for graphically recording the interval of time respectively required to discharge the different aggregates into the weighing hopper.

14. In a multiple materials batching apparatus, in combination, a multiple materials weighing hopper adapted to receive different materials to be batched, aggregate supply means associated with said weighing hopper and including control means for controlling the discharge of said aggregates into said weighing hopper, recording instrumentalities associated with said weighing hopper, and an actuator common to said aggregate supply means and recording instrumentalities and operatively connected therewith to automatically and consecutively actuate the aggregate discharge control means and the recording instrumentalities, said recording instrumentalities including means for graphically recording the interval of time respectively required to discharge the different aggregates into the weighing hopper and at the same time, the respective weights of the different aggregates discharged into the weighing hopper.

JOHN F. ROBB.